United States Patent
Ghneim

(10) Patent No.: US 9,449,390 B1
(45) Date of Patent: Sep. 20, 2016

(54) DETECTING AN EXTENDED SIDE VIEW MIRROR

(71) Applicant: Ford Global Technologies, LLC, Dearborn, MI (US)

(72) Inventor: Maher Ghneim, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/715,963

(22) Filed: May 19, 2015

(51) Int. Cl.
*G06K 9/00* (2006.01)
*G06T 7/00* (2006.01)
*B60R 1/00* (2006.01)
*B60R 1/08* (2006.01)
*H04N 5/232* (2006.01)
*H04N 5/33* (2006.01)

(52) U.S. Cl.
CPC ............ *G06T 7/0042* (2013.01); *B60R 1/007* (2013.01); *B60R 1/081* (2013.01); *H04N 5/23229* (2013.01); *H04N 5/33* (2013.01); *G06K 9/00* (2013.01); *G06T 2207/10048* (2013.01); *G06T 2207/30252* (2013.01)

(58) Field of Classification Search
CPC ... B60R 1/12; B60R 1/02; B60R 2001/1223; B60R 2011/0033; B60R 2300/302; B60R 1/04; B60R 21/01552; B60R 2022/208; B60R 21/01532; B60R 1/06; B60C 23/00; B60K 37/06; B60Q 1/2665; B60Q 3/023; B60S 1/0885; H04N 7/181; H04N 13/0242; H04N 7/183; G06T 2207/30252; G06T 7/0075; G06K 9/00825; G06K 9/00369
USPC ........ 382/104, 106, 117, 291; 340/435, 436, 340/438, 472, 901, 903
See application file for complete search history.

(56) References Cited

U.S. PATENT DOCUMENTS

| | | | | |
|---|---|---|---|---|
| 6,690,268 B2* | 2/2004 | Schofield | ................. | B60C 23/00 340/425.5 |
| 7,477,137 B2* | 1/2009 | Matsumoto | .......... | B60Q 1/2665 280/735 |
| 8,406,472 B2* | 3/2013 | Harres | ................. | G06T 7/0046 340/436 |
| 2002/0003571 A1* | 1/2002 | Schofield | ................ | B60C 23/00 348/148 |
| 2004/0196368 A1* | 10/2004 | Asai | .......................... | B60R 1/00 348/148 |
| 2005/0024494 A1* | 2/2005 | Hirota | ....................... | B60R 1/00 348/148 |
| 2005/0086000 A1* | 4/2005 | Tsuchiya | ................ | G08G 1/166 701/538 |
| 2005/0146604 A1* | 7/2005 | Shinada | .................... | B60R 1/00 348/118 |
| 2006/0132943 A1* | 6/2006 | Suzuki | ...................... | B60R 1/10 359/879 |
| 2008/0218888 A1* | 9/2008 | Sho | .......................... | B60R 1/07 359/877 |
| 2008/0239527 A1 | 10/2008 | Okabe et al. | | |
| 2010/0066518 A1 | 3/2010 | Ohshima et al. | | |
| 2010/0066833 A1* | 3/2010 | Ohshima | .................. | B60R 1/00 348/148 |
| 2010/0194596 A1* | 8/2010 | Wang | ....................... | B60R 1/00 340/936 |
| 2010/0283837 A1* | 11/2010 | Oohchida | ............. | G06T 7/0075 348/47 |

(Continued)

FOREIGN PATENT DOCUMENTS

| | | |
|---|---|---|
| JP | 4274785 B2 | 6/2009 |
| JP | 201042727 A | 2/2010 |
| JP | 2012158287 A | 8/2012 |
| JP | 2012214083 A | 11/2012 |
| JP | 2013141904 A | 7/2013 |

*Primary Examiner* — Vu Le
*Assistant Examiner* — Aklilu Woldemariam
(74) *Attorney, Agent, or Firm* — Frank A. MacKenzie; Bejin Bieneman PLC

(57) ABSTRACT

A position of a mirror in or on a vehicle can be detected by receiving a first image and a second image, and comparing the first image to the second image. The comparison is used for determining whether the vehicle mirror has moved from one of an extended state and a non-extended state.

20 Claims, 4 Drawing Sheets

(56) References Cited

U.S. PATENT DOCUMENTS

| | | | |
|---|---|---|---|
| 2011/0181728 A1* | 7/2011 | Tieman | B60R 1/00 348/148 |
| 2013/0038956 A1* | 2/2013 | Matsumoto | B60R 1/006 359/857 |
| 2014/0229106 A1* | 8/2014 | Ishikawa | G01C 21/3647 701/533 |

* cited by examiner

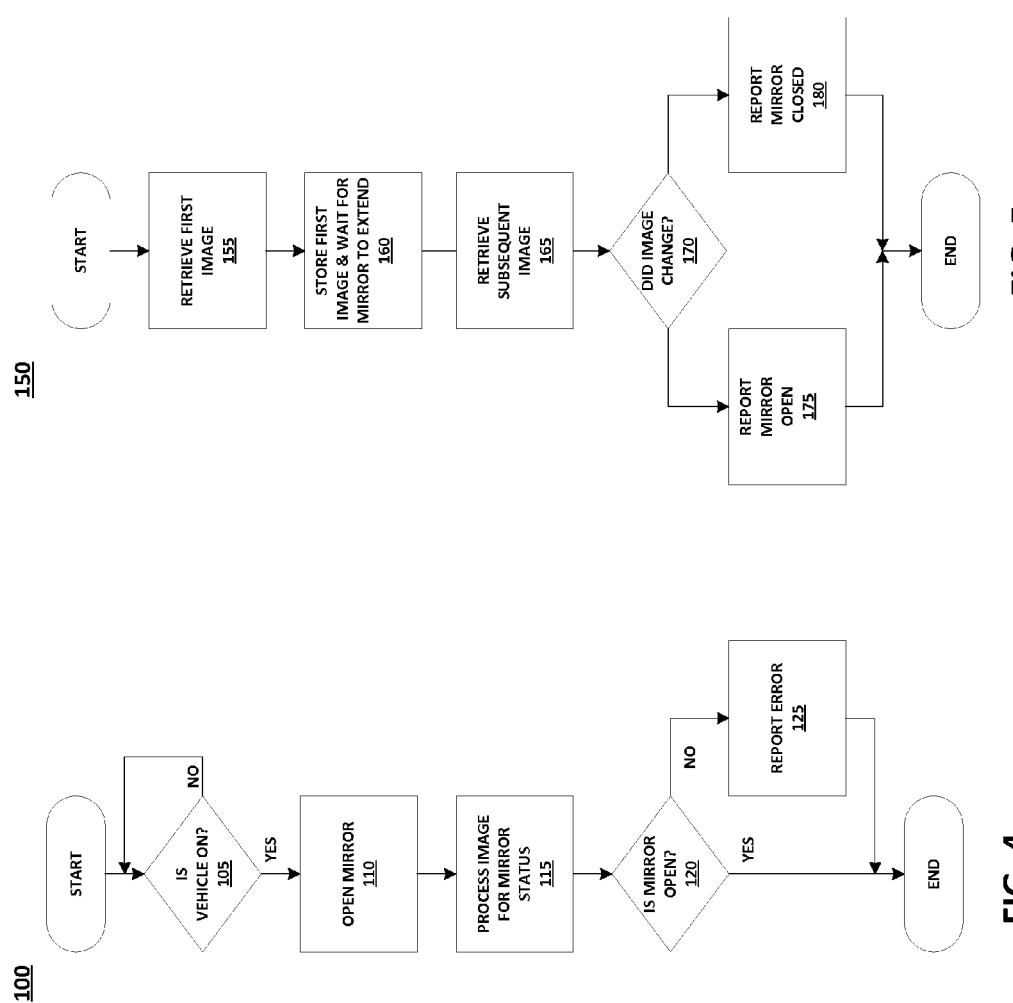

DETECTING AN EXTENDED SIDE VIEW MIRROR

BACKGROUND

A side view mirror (also fender mirror, door mirror, or wing mirror) is a mirror found on the exterior of a motor vehicle to help the driver see areas behind and to the sides of the vehicle, outside of the driver's peripheral vision, in the so-called "blind spot." Side view mirrors can be electrically extended and retracted. For example, when the vehicle is parked or being washed in an automated car wash, a mirror may be retracted. Following the car wash, driving the motor vehicle, the side view mirror then needs to be extended. Additionally, a side view mirror may have safety components integrated into the mirror, for example, a sensor can be mounted in the side mirror that will detect when a driver of the vehicle begins to drift out of a lane. Unfortunately, present vehicle systems are lacking with respect to providing a positive confirmation that a side view mirror has extended, and that safety systems related to the side view mirror can operate as designed.

BRIEF DESCRIPTION OF THE DRAWINGS

FIG. 4 is a flowchart of an exemplary process for extending a side view mirror.

FIG. 5 is a flowchart of an example process for determining if a side view is extended.

DETAILED DESCRIPTION

Figure 1:
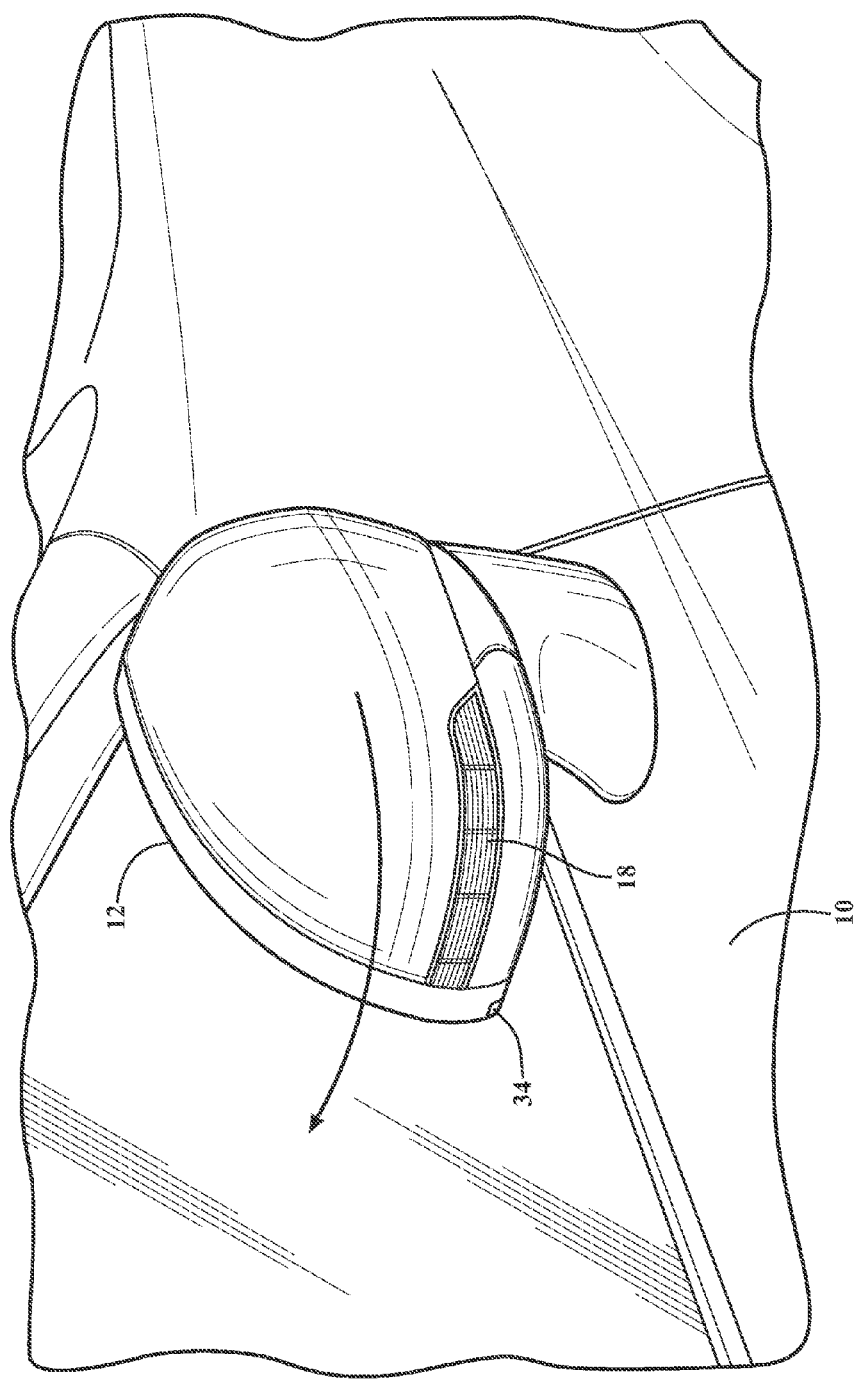
FIG. 1 is a perspective view of a side view mirror of a vehicle in a retracted position.
Figure 2:
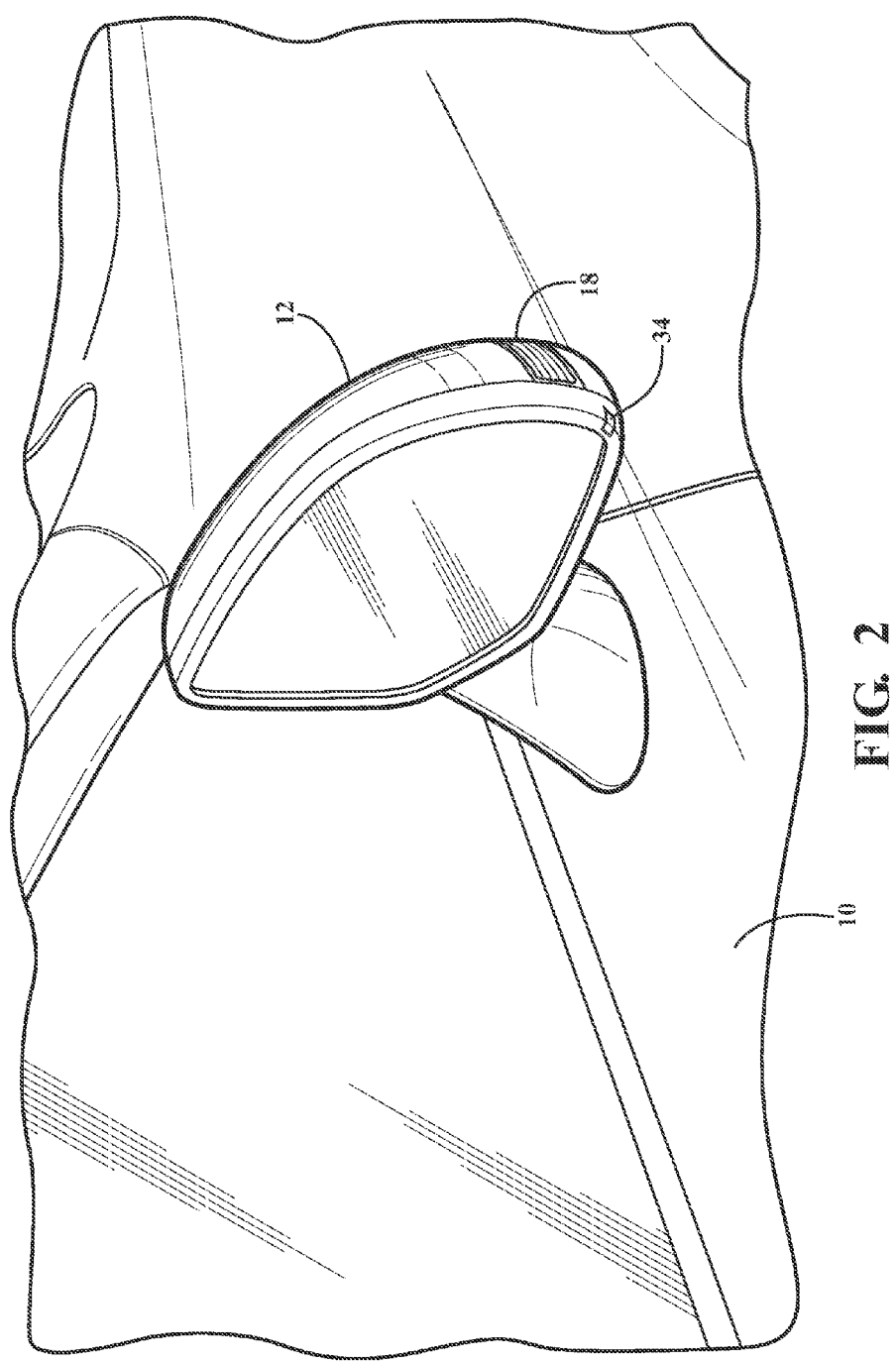
FIG. 2 is a perspective view of a side view mirror of a vehicle in an extended position.

With reference to the Figures, wherein like numerals indicate like parts throughout the several views, FIG. 1 is a perspective view of a side view mirror 12 of a vehicle 10 in a retracted position. FIG. 2 is a perspective view of a side view mirror 12 of a vehicle in an extended position. A camera 34 is positioned on an outer edge of the side view mirror 12 to detect whether the side view mirror 12 extends from a retracted position (as discussed below). A puddle light 18, such as is known, is also shown. By comparing first and second (and/or subsequent images) obtained by the camera 34, e.g., determining whether on or more quantifiable image characteristics (examples of which are discussed below) differ by more than a predetermined threshold or thresholds, it is possible to determine a position of the mirror 12 (e.g., retracted or extended), and/or whether the mirror 12 has moved from a prior detection. Note that, although techniques herein are described with respect to the side view mirror 12, concepts of this disclosure could also be applied to other mirrors, e.g., a fender mirror, door mirror, or wing mirror, etc.

Figure 3A:
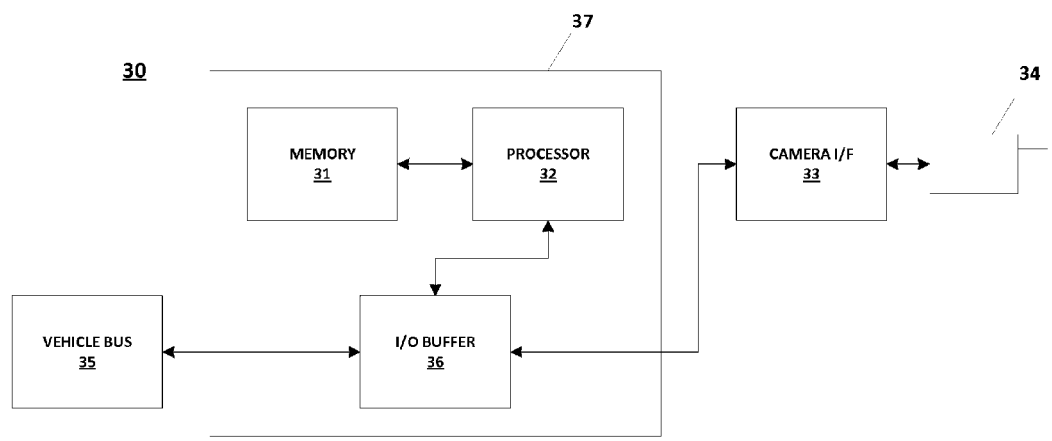
FIG. 3A is a block diagram of an exemplary mirror-state detection system.

FIG. 3A illustrates exemplary components of a side view mirror detection system 30. A processor 32 is communicatively coupled to a memory 31 and to an input/output (I/O) buffer 36. The processor 32, the memory 31 and the I/O buffer 36 are included in an electronic control unit (ECU) 37. The I/O buffer 36 of the ECU 37 is communicatively coupled to a vehicle communication bus 35 of the vehicle 10. The I/O buffer 36 of the ECU 37 is also communicatively coupled to a camera interface (I/F) 33. The camera I/F 33 is also communicatively coupled to a camera 34 positioned on the side view mirror 12 of the vehicle 10.

In operation, a first image from the camera 34 is sent to the camera I/F 33. The image is then sent to the I/O buffer 36 and then to the processor 32. The processor 32 processes (as discussed below) the first image and may store the first image and/or a set of characteristics or parameters related to the first image in the memory 31. The processor 32 may alternatively or additionally store the first image in a cache memory (not shown) of the processor 32. Using a processor's cache memory will reduce the average time to access data from the main memory which may increase the performance of a computing system. When the side view mirror 12 is retracted, the camera 34 is directed towards the vehicle 10 and the majority of the first image is typically that of the vehicle 10.

After an image is received by the ECU 37, a set of characteristics of the image can be extracted from the image. One technique for analyzing an image and extracting a set of characteristics includes pixel-counting. In this technique, the ECU 27 assigns an intensity value to each pixel, or at least from a selected set of pixels, in the received image, and then sums the number of pixels having each respective intensity value. For example, assume that an image has a resolution of 640 vertical pixels and 480 horizontal pixels, for a total of 307,200 pixels. The pixels could range in intensity from black with a zero intensity value, to white, with an intensity value of 255. There are 254 gray level pixel intensities in-between the black and the white pixels for a total of 256 pixel intensity values (0-255). The ECU 37 processes the received image by summing the numbers of each pixel intensity of the image, and storing the 256 intensities in memory as a profile of the image.

The set of characteristics extracted from a first image can be used to compare the image to a second image's set of characteristics, whereupon the ECU 37 can determine if the images are substantially different according to a comparison of the respective images' characteristics. For example, in the pixel counting technique as discussed above, if 10% or more of the pixel intensities values change from a first image to a second image, then the second image could be considered substantially different from the first image. Thus, in this example, a ten percent change in pixel intensities is a predetermined threshold for determining that images are substantially different.

Other techniques to obtain the set of characteristics of an image, which may be used alone and/or in combination with one another and/or with the pixel intensity technique discussed above, may include, for example, edge detection, pattern matching and blob detection, just to name a few. In edge detection, the "edges" are the transition boundaries of objects within an image and are found by looking for the maximum and minimum in the first derivative of the pixel intensity values. The location and the intensities of the edges are compared to determine if the images are sustainably different. For example, if the edges have moved in horizontally or vertically by more than 10 pixels, the image is considered substantially different.

Pattern matching includes identifying small mapped areas of the first image that are bit-wise compared to areas of the second image identified as corresponding, e.g., occupying a same area on the second image. In one example, if 10% or more of the pattern bits on the first image do not have the same values as their counterpart on a second image, the images are considered to be substantially different. For example, the first image can have 16 mapped regions where each region is 50 vertical pixels by 50 horizontal pixels. The ECU 37 would compare 16 regions of the first image with 16 regions of the second image, and if two (12.5%) regions are different, the images could be considered substantially different.

Blob detection refers to mathematical methods that are aimed at detecting regions in a digital image that differ in properties, such as brightness or color, compared to areas surrounding those regions, etc. If 10% or more of the blobs are not the same as their counterpart on the sequential image, the images are considered sustainably different For example, a first image could have 32 blobs, where 16 blobs are for color detection and 16 blobs are for brightness detection. The ECU 27 could compare 32 blobs of the first image to 32 blobs of the sequential image, and if 4 (12.5%) are different, the images could be considered substantially different.

As discussed above, when retracted, the side view mirror 12 camera 34 may be able to obtain an image that includes a portion of the vehicle 10 only, and does not include other items such as the ground. However, when the side view mirror 12 is extends, the camera 34 points, i.e., in general, towards the ground and the second and other subsequent images will show only a small portion of the vehicle 10 and the subsequent image will include the ground. Thus, a comparison of the first image with second and/or other subsequent images generally results in a determination that the first image and the second and/or subsequent images are substantially different, meaning that the mirror 12 has moved.

Furthermore, if the second and/or other subsequent image is substantially different from the first image, the ECU 37 can send a message via the vehicle communication bus 35 to a head unit ECU (not shown) or to a dashboard ECU (not shown) indicating that the side view mirror has moved from the retracted position. Conversely, if a comparison of the first image to the subsequent image does not indicate movement of the mirror 12, the ECU 37 can send an error message via the vehicle communication bus 35 to the head unit ECU indicating that the side view mirror has not moved from the retracted position.

In one example, the system 30 determines when the vehicle 10 starts, the ECU 37 instructs the side view mirror 12 to extend and a subsequent image is obtained by the camera 34 in the manner as discussed above for the first image. The processor 32 processes the subsequent image and stores the subsequent image or the set of characteristics or parameters related to the subsequent image in the memory 31. The processor 32 may optionally store the subsequent image in the processor 32 cache memory.

In another example, the system 30 can store an image of a fully extended mirror 12 or a set of characteristics or parameters related to the fully extended image in the memory 31. The processor 32 may optionally keep the fully extended image in the processor 32 cache memory. The processor 32 can use the fully extended image to determine if the side view mirror 12 is extended to the fully extended position by comparing the fully extended image to the subsequent image, i.e., the pre-stored fully extended image can serve as the "first image" discussed above. If a comparison of the fully extended image and a received image are substantially different, e.g., as described above, the processor 32 can send an alert message via the vehicle communication bus 35 to head unit ECU or a dashboard ECU that the mirror 12 did not fully deploy. For example, a twig may be in the side view mirror 12 path of travel and prevent the side view mirror 12 from fully extending from the retracted position. The alert message can alert a driver and the vehicle 10 of a problem with the side view mirror 12.

Figure 3B:
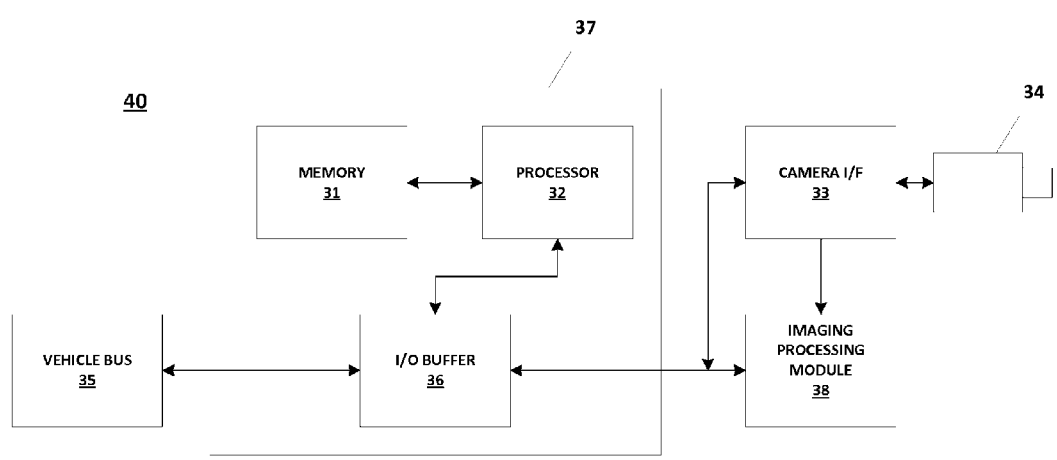
FIG. 3B is a block diagram of another exemplary mirror-state detection system

FIG. 3B illustrates another example of a side view mirror detection system 40, which is similar to the system 30, a main difference being that the system 40 includes an imaging processing module (IPM) 38. The IMP 38 is communicatively coupled to the camera I/F 33 and also to the I/O buffer 36. The IMP 38 can contain a digital signal processor and other video hardware acceleration components to off-load the imaging processing performed by the processor 32. The digital signal processor can provide better performance than most general-purpose microprocessors as the architecture of a digital signal processors are optimized specifically for digital processing of images.

In an additional example, the camera 34 can be an infrared camera to allow the camera 34 to have better performance in low light situations. An infrared camera is a device that forms an image using infrared radiation, similar to a common camera that forms an image using visible light.

The vehicle communication bus 35 allow microcontrollers, such as in an ECU 37 and other devices in a vehicle, to communicate with each other in applications without a host computer. The vehicle communication bus 35 can be a controller area network (CAN) bus, which is a message-based protocol, designed originally for automotive applications, but is also used in many other contexts. A CAN bus uses serial communication for sending and receiving messages. Serial communication refers to the process of sending data one bit at a time, sequentially, over a communication channel, such as a vehicle's communication bus.

FIG. 4 is a flowchart illustrating an exemplary process 100 of deployment of a side view mirror 12. The process 100 begins in a block 105 in which a determination is made if the vehicle is turned on. If the vehicle is on, a next block 110 is executed. If the vehicle is not on, the process will return to the block 105. In the block 110, the ECU 37 instructs the side view mirror 12 to extend. Then, in a block 115, an image from the camera 34. In a next block 120, a determination is made if the side view mirror 12 has extended. If the side view mirror 12 has extended, the process 100 ends. If the side view mirror 12 has not extended, next in a block 125, the ECU 37 reports the error, and the process 100 ends.

FIG. 5 is a flowchart illustrating an exemplary process 150 of the processing of images of the side view mirror 12. The process 150 begins in a block 155, in which a first image is retrieved from the camera 34. Next, in a block 160 the first image is stored in memory, and the ECU 37 waits a predetermined time, e.g., according to a typical time required for a mirror 12 to extend in a particular vehicle to a for the side view mirror 12 to extend. Next, in a block 165, a second, subsequent image is obtained from the camera 34 and processed. Then, in a block 170 a determination is made as to whether the first and second images are substantially different, e.g., in a manner as described above. If the images are substantially different, the process reports the side view mirror 12 did extend in a block 175, and the process 150 ends. If the images are the same, the process reports an error in a block 180 and the process 150 ends.

As used herein, the adverb "substantially" modifying an adjective means that a shape, structure, measurement, value, calculation, timing, etc. may deviate from an exact described geometry, distance, measurement, value, calculation, timing, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system for detecting a position of a vehicle mirror, comprising:
   an electronic control unit (ECU) including a processor and a memory;
   instructions stored in the memory and executable and by the processor, such that the ECU is programmed to:
      receive a first image from a camera on a vehicle mirror when the position of the mirror is known to be a first position;
      identify characteristics of the first image that indicate the first position of the mirror;
      receive a second image of the vehicle mirror;
      compare the characteristics of the first image to characteristics of the second image; and
      determine, based on whether the comparison indicates a predetermined difference between the characteristics of the first image and the characteristics of the second image, whether the vehicle mirror has moved from the first position to a second position;
   wherein the second position is one of extended and non-extended.

2. The system of claim 1, wherein the ECU is further programmed to send a non-extended message to a vehicle head unit.

3. The system of claim 1, wherein the ECU is further programmed to instruct the vehicle mirror to extend.

4. The system of claim 1, further comprising a camera communicatively coupled to the ECU.

5. The system of claim 4, wherein the camera is configured to provide at least one of the first image and the second image.

6. The system of claim 4, wherein the camera is positioned on the vehicle mirror.

7. The system of claim 4, wherein the camera is an infrared camera.

8. The system of claim 4, wherein an imaging processing module is incorporated into the camera.

9. The system of claim 1, wherein the predetermined difference is a predetermined threshold.

10. A method, comprising steps performed by a processor, the steps including:
    receiving a first image from a camera on a vehicle mirror when the position of the mirror is known to be a first position;
    identifying characteristics of the first image that indicate the first position of the mirror;
    receiving a second image of from the vehicle mirror camera after the vehicle mirror is instructed to extend;
    comparing characteristics of the first image to characteristics of the second image; and
    determining, based on whether the comparison indicates a predetermined difference between the characteristics of the first image and the characteristics of the second image, whether the vehicle mirror has moved from the first position to a second position; wherein the second position is one of extended and non-extended.

11. The method of claim 10, further comprising determining, based on the comparison, whether the first image and the second image differ by more than a predetermined threshold.

12. The method of claim 10, further comprising sending a message via a vehicle communications bus upon determining that the vehicle mirror has moved from an non-extended state to an extended state or an extended state to a non-extended state.

13. The method of claim 10, further comprising determining if the vehicle is on.

14. The method of claim 10, further comprising instructing the vehicle mirror to extend.

15. The method of claim 10, further comprising storing an image of a fully extended vehicle mirror.

16. The method of claim 10, further comprising providing the first image by a camera.

17. The method of claim 16, further comprising providing the second image by the camera.

18. The method of claim 16, wherein the camera is positioned on the vehicle mirror.

19. The method of claim 16, wherein the camera is an infrared camera.

20. The method of claim 16, wherein an imaging processor is incorporated into the camera.

* * * * *